(12) United States Patent
Cesare et al.

(10) Patent No.: US 8,176,800 B2
(45) Date of Patent: May 15, 2012

(54) METHOD FOR DETERMINING TENSION IN A ROD

(75) Inventors: Mark Cesare, Raleigh, NC (US); J. Darrin Holt, Raleigh, NC (US)

(73) Assignee: FDH Engineering, Inc., Raleigh, NC (US)

( * ) Notice: Subject to any disclaimer, the term of this patent is extended or adjusted under 35 U.S.C. 154(b) by 375 days.

(21) Appl. No.: 12/542,134

(22) Filed: Aug. 17, 2009

(65) Prior Publication Data

US 2011/0036180 A1 Feb. 17, 2011

(51) Int. Cl.
*G01L 5/04* (2006.01)
(52) U.S. Cl. ........................... 73/862.42; 73/826
(58) Field of Classification Search .......... 73/826, 73/862.381–391, 862.42–862.59
See application file for complete search history.

(56) References Cited

U.S. PATENT DOCUMENTS

| | | | |
|---|---|---|---|
| 4,012,870 A * | 3/1977 | Berniere et al. | 451/8 |
| 4,020,673 A * | 5/1977 | Welty et al. | 73/37 |
| 4,480,480 A | 11/1984 | Scott et al. | |
| 4,852,029 A | 7/1989 | Pope et al. | |
| 4,901,574 A * | 2/1990 | Fitzpatrick | 73/579 |
| 6,386,036 B1 * | 5/2002 | Borza | 73/574 |
| 6,450,032 B1 * | 9/2002 | Albert | 73/514.29 |
| 7,498,728 B2 * | 3/2009 | Albert | 310/370 |
| 7,831,397 B2 * | 11/2010 | Earlywine | 702/45 |
| 7,958,788 B2 * | 6/2011 | Ford | 73/862.59 |
| 2008/0011091 A1 | 1/2008 | Weldon | |

OTHER PUBLICATIONS

McInerney et al.; "Acoustic Nondestructive Testing of Steel Reinforcing Members in Concrete"; Proceedings of the Army Science Conference (26th), Orlando, Florida, Dec. 2008, pp. 1-8.

* cited by examiner

*Primary Examiner* — Max Noori
(74) *Attorney, Agent, or Firm* — Coats & Bennett, P.L.L.C.

(57) ABSTRACT

A method of determining the tension in an elongated rod is described. The method includes impacting the rod and measuring the vibration response of the rod. Further, the method entails generating a theoretical vibration response of the rod based in part at least on the structural properties of the rod. Thereafter, the method entails adjusting the theoretical vibration response to cause the theoretical vibration response to conform with at least a portion of the measured vibration response. Based on the adjusted theoretical vibration response, the tension of the rod is determined.

24 Claims, 8 Drawing Sheets

METHOD FOR DETERMINING TENSION IN A ROD

FIELD OF THE INVENTION

The present invention relates to evaluating the integrity of tension members in concrete structures. More particularly, the invention relates to determining the tension in tension rods or anchor tendons which secure trunnions for movable gate spillways in dams.

BACKGROUND

Movable gate spillway dams are used in controlling the water flow over dams, particularly power generation dams and flood control dams. These dams include movable portions that provide a means of to release large quantities of water. One particular version includes the so-called Tainter Gate Spillway on a concrete dam. The Tainter gate is basically a curved flood gate panel which forms an outer surface of a sector of a circle. Water upstream is held by the curved flood gate panel when the gate is raised. The curved panel is supported on a radial structure that forms a pivot opposite the downstream side of the curved panel. A side view of the gate is thus seen as a sector of a circle. The pivot engages a trunnion that is connected to and supported by the concrete dam structure. The gate can then pivot about the trunnion to raise or lower the gate.

The trunnion is secured to the concrete dam structure by tension rods or anchor tendons. Each rod or tendon is encased in a sheath, and the sheathed rod is embedded in the concrete. One end of the rod or tendon is anchored within the concrete structure to resist the rod being pulled out of the structure. The other end of the rod extends outwardly and is not embedded in concrete. The rod portion not embedded in concrete is connected to a trunnion and secured thereto generally by a nut threaded on the end portion of the rod and abutting an anchorage plate on the trunnion. This arrangement provides for the rod or tendon to be in tension and resist the force of water held back by the gate.

This construction approach is beneficial in terms of cost as compared to methods in which the anchorage structure for the trunnions is not encased in concrete. However, the construction described does no lend it self to visual inspection of the tension rods. The ability to periodically assess the structural integrity of the rods is important in maintaining safe and efficacious dam function. When tension rods or tendons are damaged, catastrophic failure can ensue or a gate may need to be permanently closed at a large cost and possible loss of the ability to control a maximum probable flood. Accordingly, there exists a need for a method of periodically assessing the integrity of the rods or tendons to determine whether they are in good condition.

SUMMARY OF THE INVENTION

The invention provides a method of determining the tension in a rod that anchors a movable gate spillway trunnion in a dam. The method comprises mounting one or more transverse motion sensors to the rod. The rod is impacted and transverse motion data is recorded from the one or more sensors over a period of time. The method further includes analyzing the transverse motion data and producing a measured frequency response of the rod. A theoretical model of the rod is also generated, and the theoretical frequency response of the model is calculated in order to derive a series of theoretical modal frequencies for the model. The method includes superimposing the series of modal frequencies for the model on the measured frequency response of the rod and adjusting a tension parameter in the model such that at least one modal frequency of the model is approximately equal to a resonance frequency in the measured frequency response.

The present invention also entails a method of determining the tension in an elongated rod. The method basically includes impacting the rod and measuring a vibration response of the rod. Further, the method entails generating a theoretical vibration response of the rod and comparing the measured and theoretical vibration responses. The theoretical vibration response is adjusted to cause at least a portion of the theoretical vibration response to conform with at least a portion of the measured theoretical vibration response. The tension in the rod is determined based on the adjusted theoretical vibration response.

Other objects and advantages of the present invention will become apparent and obvious from a study of the following description and the accompanying drawings which are merely illustrative of such invention.

DESCRIPTION OF THE INVENTION

The present invention relates to determining the tension in a rod. In one particular embodiment, the invention relates to assessing the structural integrity of tension rods or anchoring tendons for securing a movable flood gate trunnion to a concrete dam structure. More particularly, the invention relates to determining the tension in a rod in situ in a trunnion anchorage system. Before describing the invention in detail, a general description is in order of a dam and movable flood gate system in which the invention may be utilized.

Dams generally provide one or more fixed elevation spillways over which water may flow when a dammed reservoir water level reaches a certain stage. In some applications, however, it is desirable to permit the reservoir level to rise substantially above the fixed spillway level before permitting flow over the spillway. Power generation dams are examples of such applications. In order to provide this functionality, movable floodgates are employed. An example of such a movable flood gate is the so-called Tainter gate.

Figure 1:
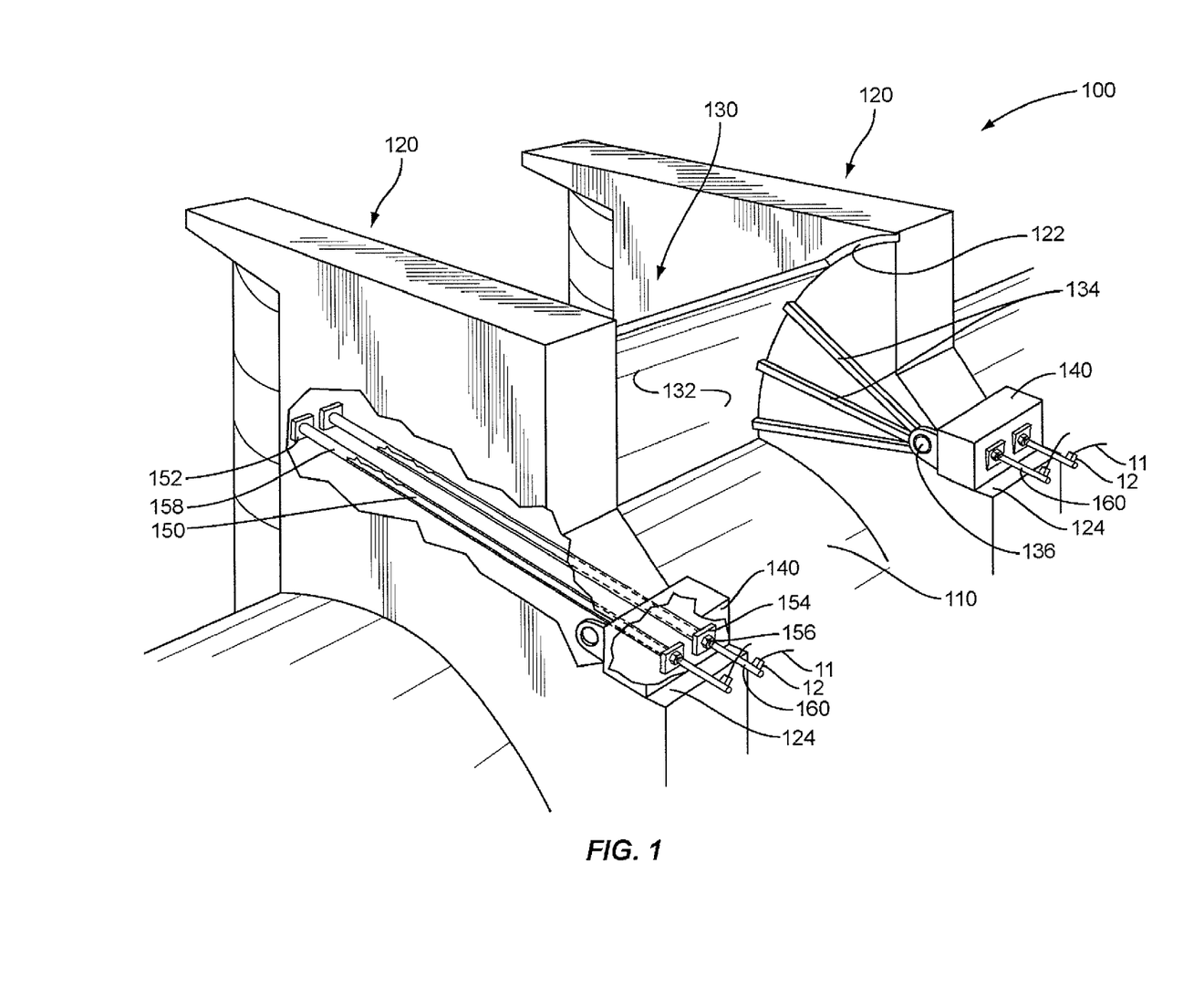
FIG. 1 is a pictorial view of a Tainter Gate Spillway in a dam.

As seen in FIG. 1, a dam 100 includes a spillway 110 defined between two piers 120. Mounted between piers 120 is Tainter gate 130 comprised of a curved panel 132 supported on radial arms 134. Radial arms 134 converge at pivot shaft 136 that is rotatably supported by trunnions 140. Sides of curved panel 132 may slidably engage with curved leak-limiting slots 122 in side faces of piers 120. It is to be appreciated that a water reservoir is on the convex or upstream side of curved panel 132. When gate 130 is closed the panel is in the lower position as shown in FIG. 1 and water is prevented from flowing downstream over the dam by curved panel 132. When gate 130 is opened by rotating radial arm structure 134 about pivot shaft 136, water from the reservoir is permitted to flow under panel 132, over spillway 110, and downstream from dam 100.

Figure 2A:
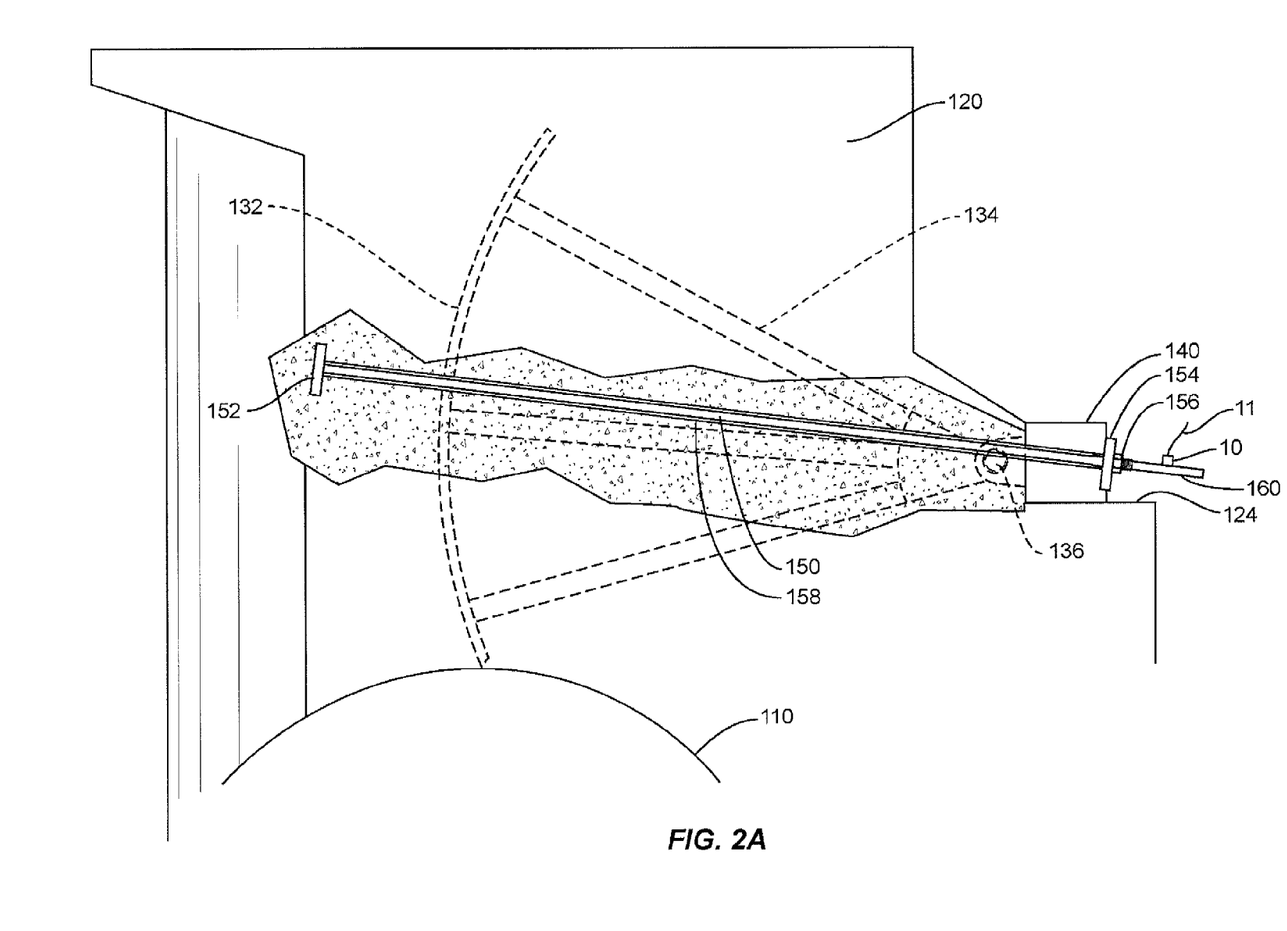
FIG. 2A is a side sectional view of a trunnion and anchoring rod.
Figure 2B:
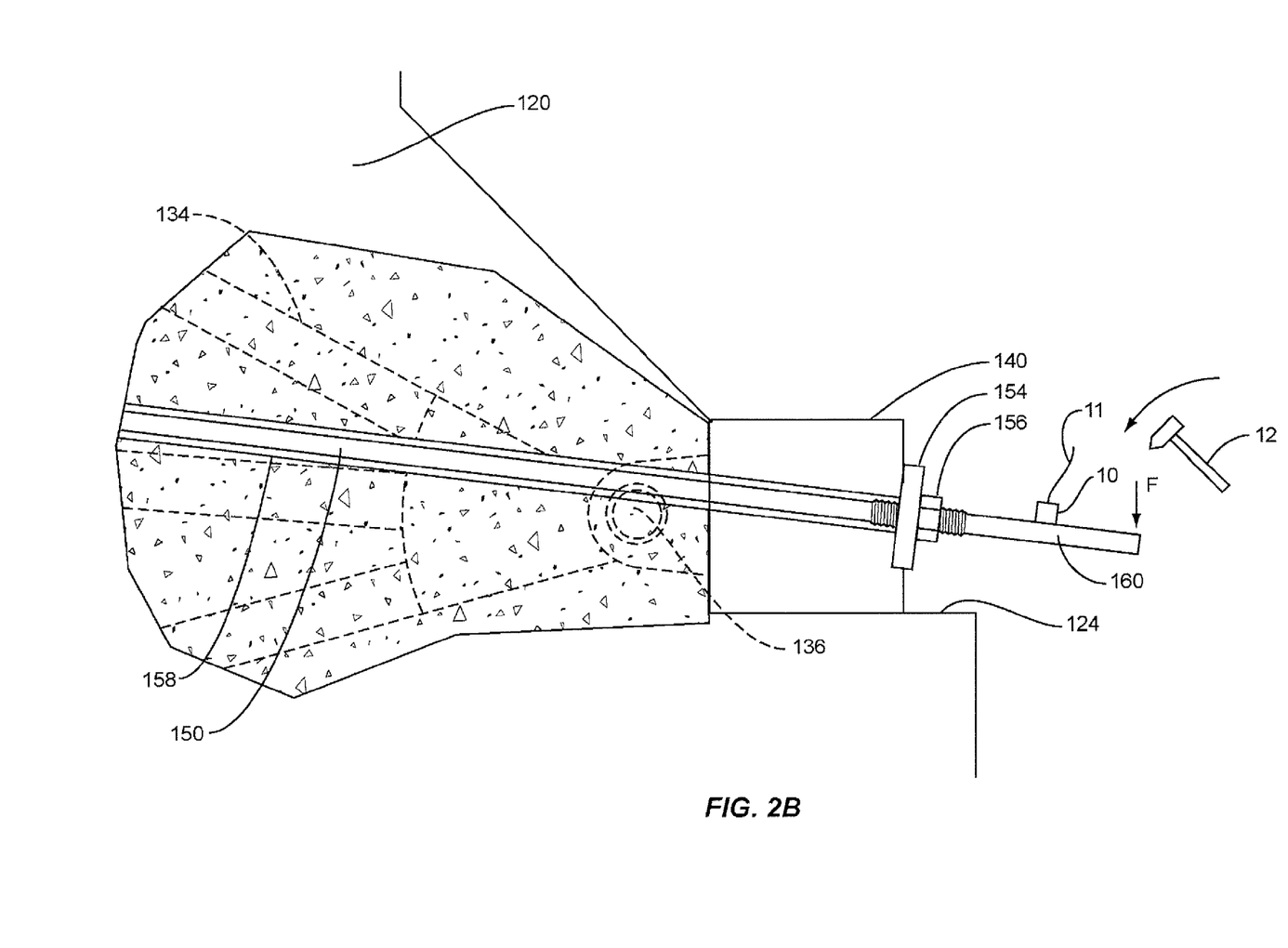
FIG. 2B is a fragmentary side elevation view of a trunnion and anchoring rod.

Trunnions 140 are supported on ledges 124 that form a port of piers 120. Pivot shafts 136 are journaled in trunnions 140. Tension rods or anchorage tendons 150 extend in a generally upstream direction into piers 120 and are anchored in the piers by tendon anchorage plates or anchorage means 152 embedded in the concrete of the piers. Downstream ends of rods 150 are secured to trunnions 140 to prevent gate 130 from being pushed downstream by the water held back by panel 132. Rods 150 typically extend through trunnions 140 to facilitate securing the rods to the trunnions. A typical means of securement is provided by dry-mounted trunnion anchor plates 154 positioned on the downstream side of the trunnions. Rods 150 extend through openings in anchor plates 154 and nuts 156 are tightened on the rods as shown in FIGS. 2A & 2B. In some cases, nuts 156 are threaded and engage threaded portions of rods 150. In other cases nuts 156 are of the so-called Howlett grip nut type. In any case, nuts 156 provide a secure connection of rods 150 to trunnions 140 such that the rod portions between trunnions 140 and anchorage means 152 are tensioned. An untensioned or free end portion 160 of each rod 150 extends downstream of each nut 156.

As shown in FIGS. 2A and 2B, at least between anchorage plates 152 and trunnion 140, each rod 150 is encased in a liner 158. Each liner 158 is typically a plastic sheath-tube within which rod 150 is free to move. Liners 158 prevent rods 150 from being in contact with the concrete of pier 120 along the tensioned portions of the rods.

When installed, rods or tendons 150 are post-tensioned for restraint of trunnions 140 and thus of gate 130. That is, trunnions 140 are secured against piers 120 by, for example, tightening nuts 156 to produce a persistent tension in rods 150. Obviously, the degree to which rods 150 are maintained in tension at all times is related to the safe function of gate 130. Nut loosening, rod deterioration, or rod fracture are among factors that may result in a reduction or loss of tension in rods 150 and in consequent compromise of the safe and effective functioning of gate 130. The instant invention is directed at measuring the tension in tendons or rods such as rods 150 in situ.

Turning now to a detailed description of the instant invention, a method is provided for measuring tension in rod 150 in dam 100 described above. This method is based on measuring the vibration response of rod 150 to an applied impact. In particular, the method provides for inferring the tension in rod 150 by system identification from an impact vibration response measured at a point on the untensioned end portion 160 of the rod. The impact vibration response may be initiated, for example, by striking untensioned portion 160 with an impacter or hammer 12 as illustrated in FIG. 2B.

Generally, the method exploits the dependence on rod tension of the transverse or flexural vibration response of rod 150. Considering rod 150 to be modeled as a rod of uniform cross-section and material properties that is under axial tension, the equation of motion is:

$$EI\frac{\partial^4 u}{\partial x^4} + T\frac{\partial^2 u}{\partial x^2} + m\frac{\partial^2 u}{\partial t^2} = 0 \quad [1]$$

where
 u=transverse deflection of the rod at position x along the rod,
 t=time,
 E=elastic modulus of the rod material,
 I=area moment of inertia of the rod cross section,
 T=rod tension, and
 m=mass per unit length of the rod.

Solution of the Equation 1 for a case where rod 150 is provided an initial disturbance, such as an impact for example, illustrates that the model rod will undergo periodic flexural deformation and exhibit an infinite number of resonance frequencies or modal frequencies. This flexural deformation entails transverse cyclic deformation of rod 150. The modal frequencies are dependent, according to Equation 1, on the parameters E, I, T, and m. E is known from construction specifications. Area moment of inertia, I, can be computed from the known cross-sectional dimensions rod 150. T is an assumed or initially estimated tension in the rod. The mass per unit length, m, can be determined from the known density of rod 150, the rod's cross section and the rod's length.

The method includes conducting a test to cause rod 150 to vibrate or exhibit a vibration response and recording that response. The method further includes developing a theoretical or expected vibration response of a model system including a rod of the same dimensions and properties as rod 150. The development of the expected vibration response includes initially estimating the tension in rod 150 and entering this tension as the parameter T of the model rod system and Equation 1. The expected and measured vibration responses are then compared. If the expected and actual or measured vibration responses are not sufficiently congruent, the method includes adjusting T in the model system and generating a new theoretical vibration response. This process is repeated until the theoretical vibration response is sufficiently congruent with the measured or actual vibration response of rod 150. The value of T at this point in the process is the measured tension in rod 150.

Figure 3:
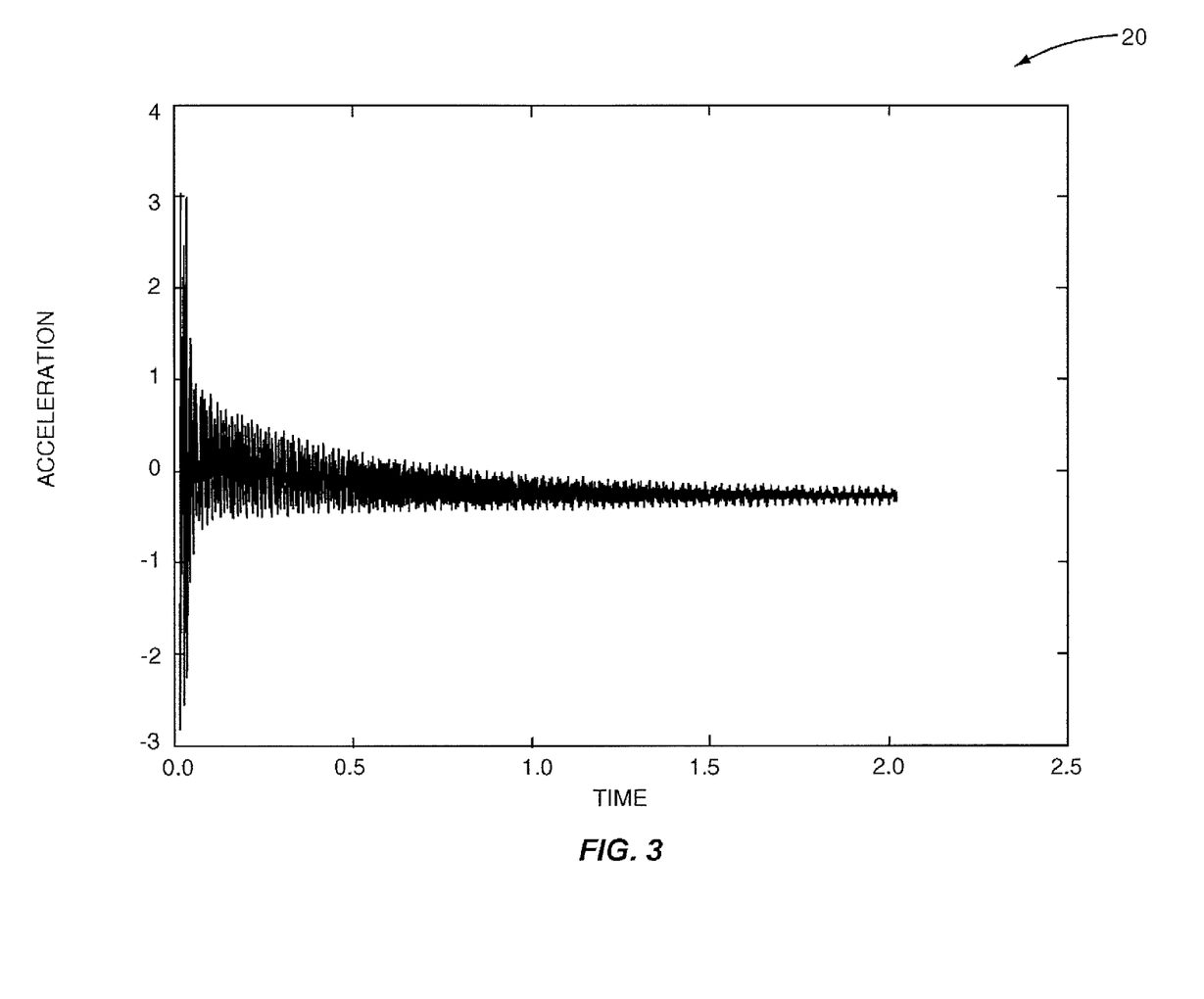
FIG. 3 is a typical rod model impact transient response.

Obtaining an actual or measured vibration response of rod 150 includes mounting a transverse motion sensor 10 on the untensioned portion 160 of the rod and connecting the sensor to an appropriate signal conditioning and recording system of well known design. In one embodiment sensor 10 is a piezoelectric accelerometer with a connection 11 to a signal conditioning and recording system (not shown) that includes a charge amplifier, and an amplifier, a filter, a digital data acquisition system, and a computer with display all of which are well known. Accelerometer 10 may be mounted to rod portion 160 variously including a threaded stud connection, a magnet, or an adhesive all of which are well known accelerometer mounting approaches. The method further includes applying a transversely-directed impact to untensioned end portion 160 and recording the resulting signal from accelerometer 10 for a period of time. In one embodiment, the impact is delivered by a manually wielded hammer or impacter 12 to produce a momentary impact force F as shown in FIG. 2B. The period of time for recording varies with the condition of the rod. The recording time period is typically between 1 and 10 seconds. The resulting recorded signal is known as the impact or transient response. Transient response 20 of FIG. 3 is typical of an impact or transient response obtained for a rod such as rod 150. Transient response 20 is a typical "ringing" response illustrated by a damped cyclic or oscillatory pattern. In the example of FIG. 3, the measured acceleration cycled between plus 3 and minus 3 acceleration units and gradually diminished over about 2 time units.

In some cases, when a measured transient or impact response is obtained as described above, the acceleration signal may be clipped during at least an early portion of the recorded response. Clipping is evidenced by the recorded transient response exhibiting oscillation between constant plus and minus values during an initial portion of the recording period. Clipping is generally due either to saturation or overloading of the accelerometer or one of the components in the signal conditioning and recording. In the event of clipping, the test may be repeated using a smaller impacter or hammer 12, and such repeating may be continued until an unclipped response is obtained.

In some cases the recorded signal is too small or damps out too rapidly to be usable. The degree to which this can be a problem is dependent at least in part on the precision of sensor 10 and signal conditioning and recording system. Generally, however, a transient response that damps out in less than a few seconds is inadequate. When a test results in an inadequate recorded signal, a larger impact may be needed. The test may be repeated using a larger impacter 12, for example.

Figure 4:
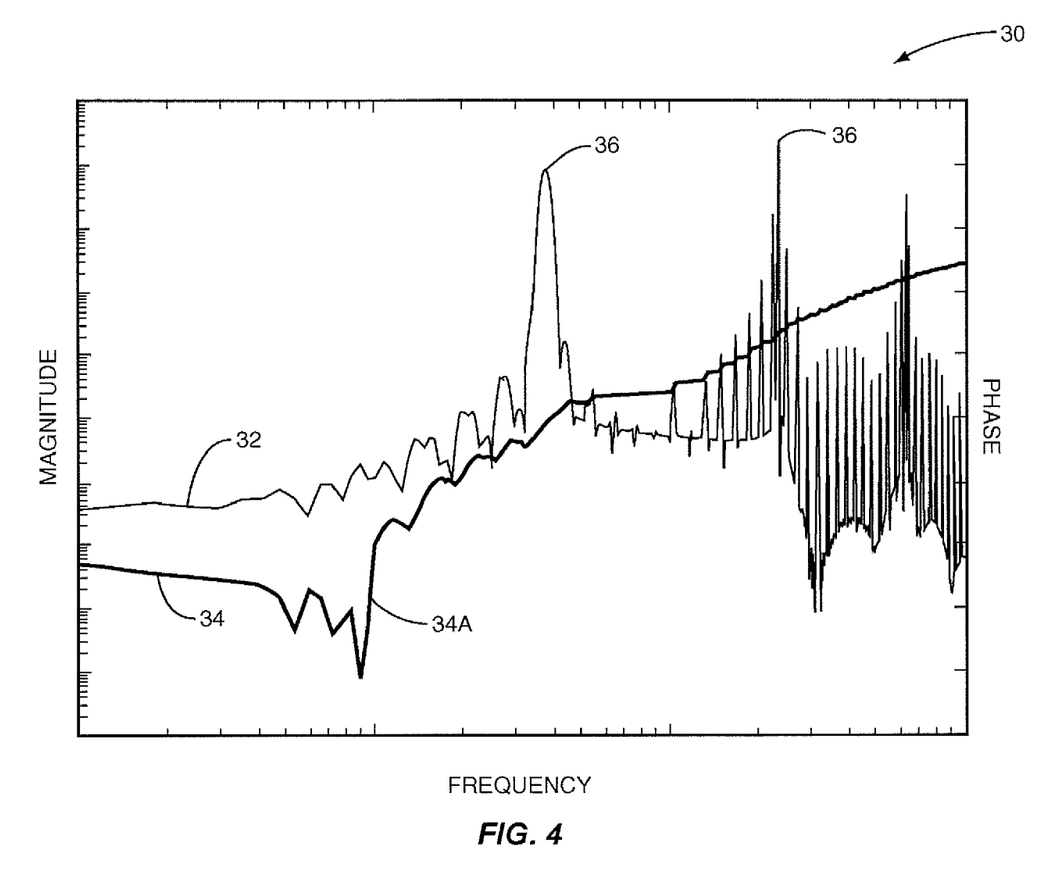
FIG. 4 is a typical rod model frequency response obtained by Fourier Transformation.

Once an unclipped and adequately large transient response signal has been recorded, the resulting data are, in one embodiment, subjected to numerical Fourier transformation using commonly available software to produce the actual frequency response such as the frequency response 30 shown in FIG. 4. It is acknowledged that there are alternative approaches to obtaining vibration frequency response, including analog filtering. Frequency response 30 is a complex quantity expressed as a function of frequency. Frequency response 30 may be conveniently expressed as a magnitude 32 and a phase 34, each represented as a function of frequency. The magnitude portion 32 exhibits a series of maxima 36, each maximum occurring at typically a different frequency. The associated series of frequencies is sometimes referred to as the modal frequencies of rod 150 in situ. Having obtained measured frequency response 30, the method includes generating a theoretical or expected vibration response and expressing this response as an expected spectral decomposition.

In one embodiment, the expected spectral decomposition for rod 150 is generated by finite element analysis (FEA). It is recognized that other well known approaches can be used to generate the expected spectral decomposition, including analytical solution of Equation 1. However, the finite element analysis may be straightforwardly accomplished by any of a variety of computer applications that are fast and easy to utilize.

To perform the FEA, a model of rod 150 in situ is created. In one embodiment, a model of in situ rod 150 in dam 100 includes a rod or beam of uniform cross-section and density. The rod in the model is supported by a first support point at one end to represent anchorage plates 152 and a second support point to represent the connection of rod 150 to trunnion 140 and the support provided by the trunnion. The modeled rod is constrained by boundary conditions that represent the support arrangement at the first and second support points of rod 150. The transverse displacement of rod 150 as well as the slope of the rod at the first support point is constrained to zero representing cantilever support of the upstream end of rod 150 by anchorage 152. At the second support point the modeled rod is constrained to have zero transverse displacement representing vertically motionless trunnion 140. Also at the second support point, bending of the model rod is constrained by a rotational spring representing the stiffness imposed by nut 156 on rod 150. The nut stiffness is otherwise referred to as a torsional spring rate, $K_r$. The modeled rod is subject to a unit impact force applied transversely to a portion corresponding to untensioned portion 160 of rod 150 and representing force F applied to the rod as shown in FIG. 2B. A solution is obtained for Equation 1, subject to the above described boundary conditions, by means of the FEA and may be expressed as an expected transient or vibration response representing the expected vibration of rod 150 in response to impact F. In the FEA, the model tension, T, is fixed at zero in the portion of the modeled rod corresponding to untensioned portion 160 of rod 130, while T is held at a constant value equal to an estimated or initial rod tension in the portion of the modeled rod between the first and second supports. For a given measurement of rod 150, assumed or estimated values of the tension, T, and nut stiffness, $K_r$, are selected. Typically, the assumed or initially estimated value of T is the specified pre-tension obtainable from design and construction documents for dam 100. An estimated value of nut stiffness, $K_r$, may be obtained from the known geometry of the nut by well known methods.

The FEA solution may produce an initial expected transient response similar to response 20 shown in FIG. 3, which is numerically transformed to an initial expected frequency response similar to frequency response 30 shown in FIG. 4. The expected frequency response magnitude may exhibit a series of maxima or resonances that define the initial expected modal frequencies for rod 150 in situ. The expected spectral decomposition is a series of generally increasing numbers, each number being the frequency in Hertz (Hz) at which an associated maximum in the frequency response occurs. The spectral decomposition can be expressed graphically as a horizontal frequency axis 48 from which vertical or spectral lines such as line 48A and 48B extend perpendicularly from points on the axis that represent the respective modal frequencies, as seen, for example, in FIG. 5.

Figure 5:
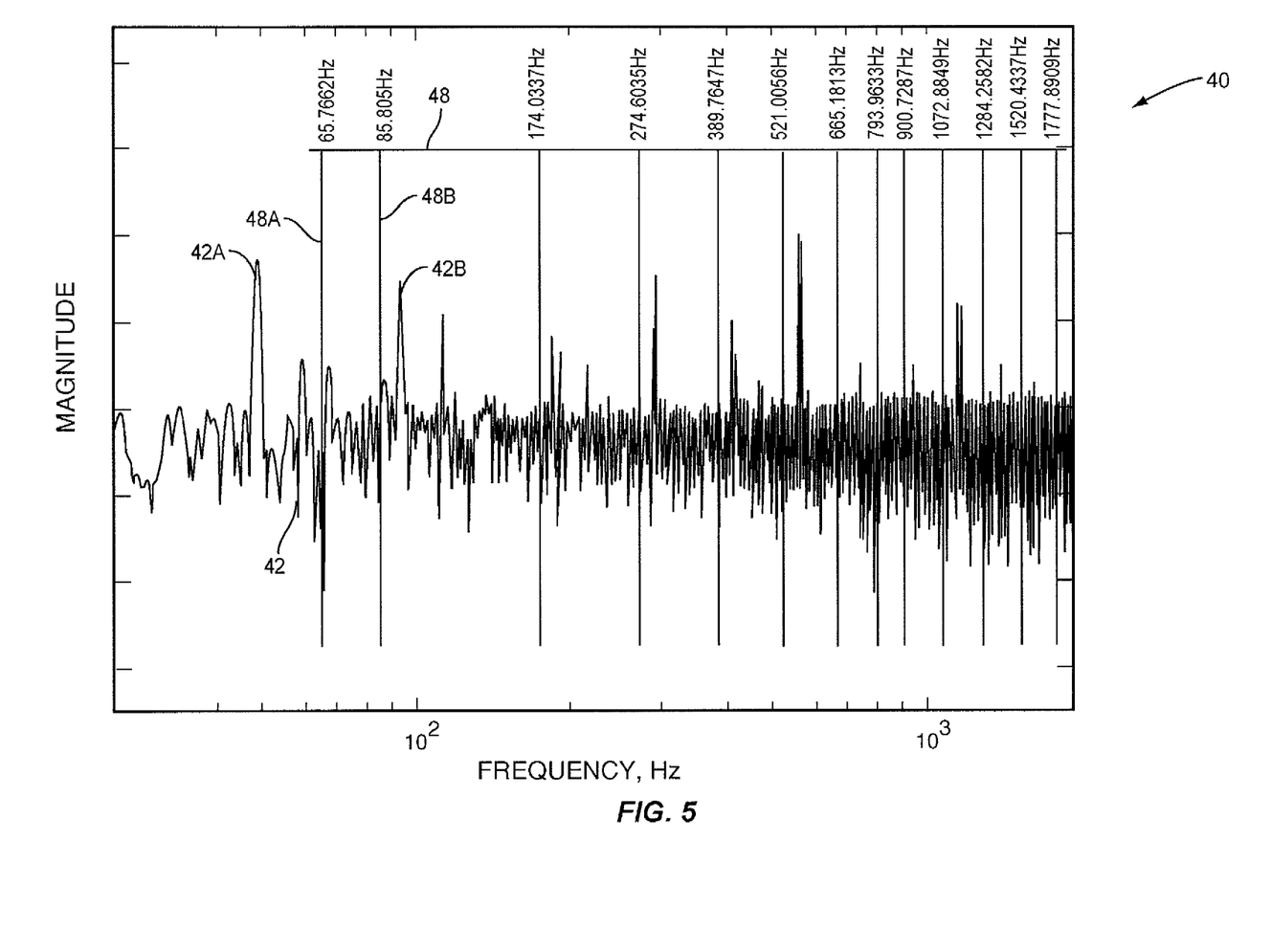
FIG. 5 is an actual rod frequency response with the unadjusted model rod modal frequencies overlaid.

FIG. 5 also shows a portion of typical actual or measured frequency response 40 of rod 150 expressed as a graph of magnitude 42 versus frequency versus frequency. Comparing the locations of spectral lines 48A and 48B, for example, to the locations of the maxima 42A and 42B in magnitude 42 shows, in this example, that the spectral lines do not align with the maxima. In other words, the expected frequency response is incongruent with the actual or measured frequency response of rod 150. Typically, especially in cases of the actual rod tension having reduced due to rod or other damage, the expected modal frequencies will be higher than the actually observed modal frequencies as is illustrated in FIG. 5. As can be appreciated from FIG. 5, spectral lines 48A and 48B could be made to generally coincide with maxima 42A and 42B by horizontally shifting the lines along axis 48.

This shifting of the expected spectral decomposition lines is the means of determining the tension of rod 150. To shift the spectral decomposition, the tension, T, and second support point or nut stiffness, $K_r$, values are iteratively adjusted to bring the expected spectral decomposition into general congruence with the measured frequency response, at least as far as lines 48A and 48B are concerned. That is, the values of parameters T and $K_r$ are adjusted so as to shift expected spectral lines so that at least the first two spectral lines 48A and 48B generally coincide with the identified first two maxima 42A and 42B in the magnitude of the measured or actual frequency response. This is done making trial adjustments to T and $K_r$ and generating a new expected spectral decomposition by, for example, re-executing the FEA as described here above. This process is repeated until general congruence is obtained.

Figure 6:
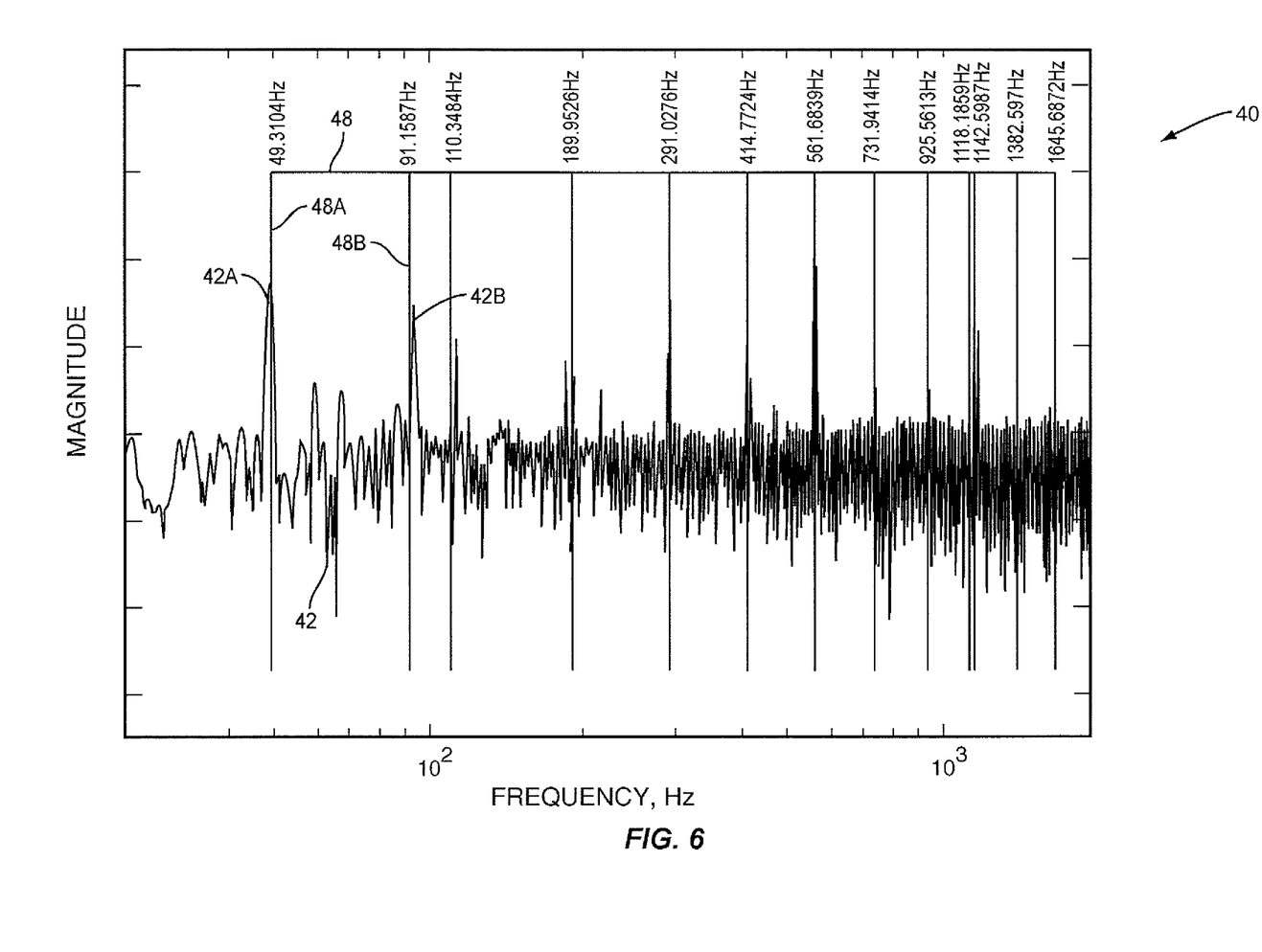
FIG. 6 is an actual rod frequency response with the adjusted model rod modal frequencies overlaid

Experience shows that the value first or lowest frequency in the expected spectral decomposition, is dependent on the values of $K_r$ and T, while the value of the second frequency in the decomposition is dependent mainly only to the value of T. That is, for example, the frequency of spectral line 48A in FIG. 5 is dependent on the value of both $K_r$ and T. However, the frequency of the second expected spectral line, line 48B for example, depends mainly on T. The method includes changing $K_r$ and T incremental amounts, generating another expected frequency response, and observing whether the first frequency of the expected spectral decomposition is closer in value to the maximum of the measured frequency response magnitude of rod 150. This process is repeated until the expected and measured first expected spectral frequency generally coincides with the first maximum 42A in magnitude response 42 shown in FIG. 6. During this process $K_r$ is generally adjusted first to determine if spectral line 48A can be shifted sufficiently to obtain congruence with maximum 42A. If not, the value of T may also be adjusted. Once congruence is obtained between line 48A and maximum 42A, the process is continued by adjusting only T until congruence of line 48B with maximum 42B is obtained. The final adjusted value of T is the measured tension in rod 150. It is generally not necessary to assess the congruence of other, higher modes although the higher modes will shift in frequency due to the adjustments described above and will be congruent with higher observed modes. FIG. 6 data was in ideal laboratory conditions and the first ten modes align with the observed modes.

Typically, the modal frequencies expected based on the FEA are greater than the corresponding modal frequencies observed in the measured response of rod 150. In such case, the adjustments to $K_r$ and T made in the above-described process amount generally to reducing the values of the $K_r$ and T. However, this may not always be the case and experimentation may be required in some cases.

To further illustrate the method, the actual values obtained in an example may be considered with the assistance of FIGS. 5 and 6. The figures display a portion of measured frequency response 40 presented as a magnitude 42 and a phase 44 versus frequency as has been noted above. Magnitude response 42 exhibits first and second identified resonances or maxima 42A and 42B at about 65.76 and 85.80 Hz, respectively. For the rod 150 under study, the first two spectral lines 48A and 48B in the expected spectral decomposition occurred at about 49 and 92 Hz, respectively. The initial estimates of T and $K_r$ utilized to generate the initial expected spectral decomposition for rod 150 were 5000 lb and 10000 ft-lb/radian, respectively. By successive adjustments of $K_r$ and T, as here above described, the expected frequency response was modified such that spectral lines 48A and 48B shifted to approximately 49.3 and 91.1 Hz, respectively illustrated in FIG. 6. The value of $K_r$ obtained was $3 \times 10^6$ ft-lb/radian. The final value of T obtained was 1223 lb, the measured actual tension in rod 150.

Figure 7:
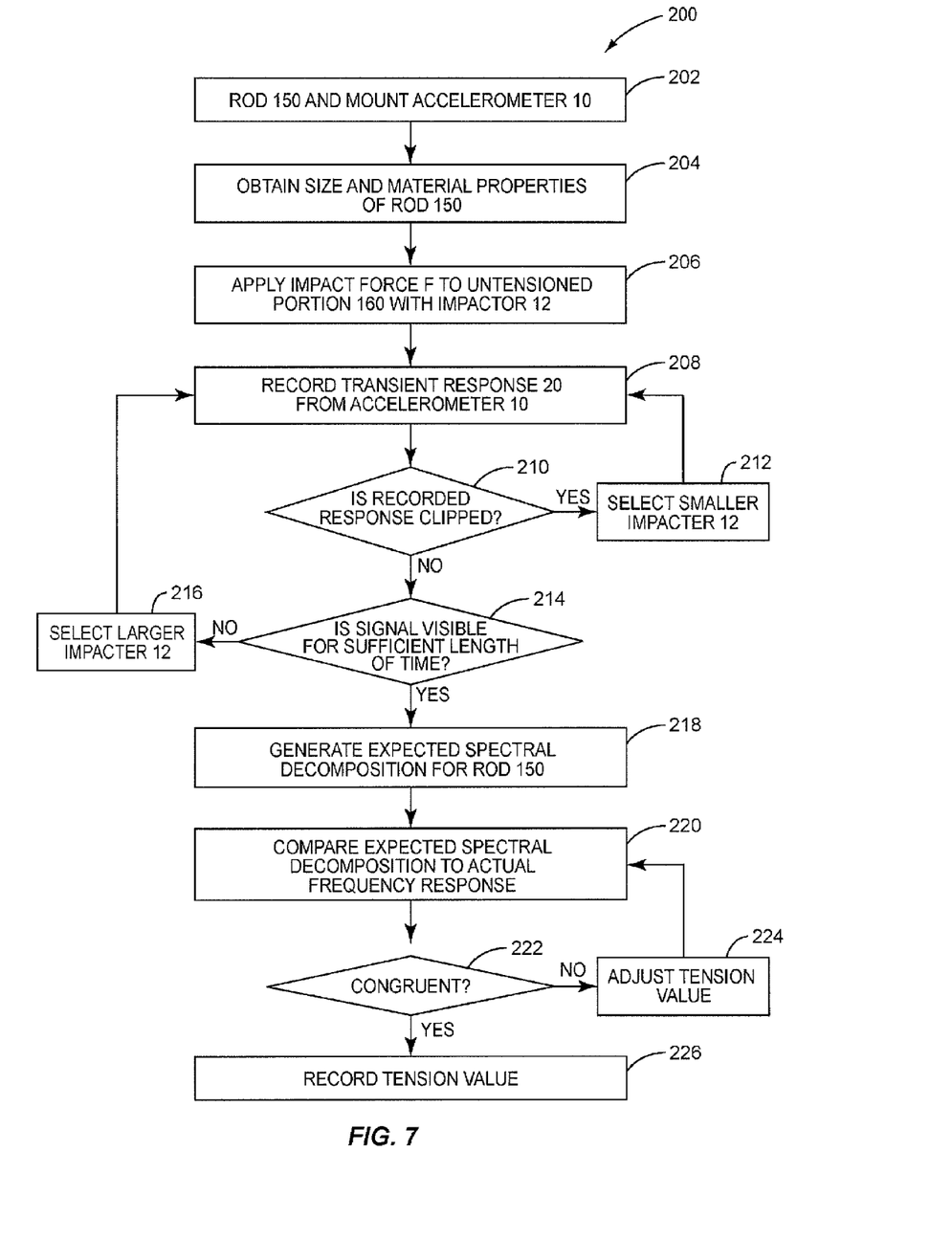
FIG. 7 is a flowchart of the method.

A testing protocol provided by the invention is illustrated by flow chart 200 in FIG. 7. The protocol includes exposing the untensioned portion 160 of rod 150 and affixing one or more motion sensors 10 to the rod as indicated by block 202 and illustrated in FIG. 2B. Block 204 calls for obtaining the structural and material properties of rod 150 for use in generating the expected frequency response of the rod. Per block 206, an impacter 12 is selected and utilized to strike untensioned end portion 160 and apply an impact force F as illustrated in FIG. 2B. The transient response is collected by the data acquisition system as provided in block 208. Logic blocks 210, 212, 214, and 216 describe the process of assuring a sufficiently large, unclipped transient response is obtained as described above. According to block 218, the initial expected spectral decomposition for rod 150 is generated using a computer and FEA, for example, based on Equation 1 with known structural and material properties of the rod 150 and estimated values of $K_r$ and T as has been described before. As called for in block 220 the expected spectral decomposition for rod 150 is compared to the actual or measured frequency response of rod 150. An assessment of congruency is made (Block 222), and if congruency does not exist, the tension value, T, is adjusted (Block 224) and a new or adjusted spectral decomposition is generated (Block 218). As indicated by Block 226, when congruency is obtained the value to which the tension, T, has been adjusted to obtain congruency is recorded as the measurement of the actual tension in rod 130.

As has been noted here above, the invention is not limited to use of a particular kind of motion sensor 10. There are many different types of such sensors including velocity and displacement sensors. Also, in some embodiments, more than one sensor 10 may be used in order to sense transverse motion of rod extension 160 in radially different directions. Additionally, the manner of exciting rod 150 in order to obtain a measured frequency response is not limited to impacting untensioned end 160. There are numerous well known ways to excite a mechanical system and determine its frequency response. For example, untensioned end 160 could be exposed to a continuous cyclical driving displacement that is varied over a range of frequencies to generate a mechanical impedance frequency response from which modal frequencies can be determined. Additionally, operation of the gate or action of water on the spillway may be used to excite the rods.

Above, much of the discussion is focused on an example of an elongated rod used in a trunnion anchorage system. It is appreciated that the method of determining the tension of a rod, as disclosed herein, is applicable to a wide variety of rods used in a variety of applications. For example, the method of the present invention is applicable to tie-back rods. These are rods used for holding back retaining walls and other masonry or concrete walls such as sea walls. In addition, the present method of determining the tension in a rod can be used in the case of earth anchors used for what is known as soil or rock anchor nailing. Further, and in the way of another example, the method of determining the tension in a rod can be used in the case of tensioned rods that are used for holding guy cables in tension for tall guy towers.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A method of determining the tension in an elongated rod, comprising:
    a. transversely impacting the rod;
    b. measuring the transverse vibration response of the rod;
    c. generating a theoretical transverse vibration response of the rod;
    d. comparing the measured and theoretical transverse vibration responses;
    e. adjusting the theoretical transverse vibration response to cause the theoretical transverse vibration response to conform with at least a portion of the measured theoretical transverse vibration response, and;
    f. determining the tension in the rod based on the adjusted theoretical transverse vibration response.

2. The method of claim 1 wherein transversely impacting the rod includes striking a first end portion of the rod.

3. The method of claim 1 wherein measuring the transverse vibration response of the rod includes securing at least one motion sensor to a first end portion of the rod and collecting temporal data from the at least one motion sensor.

4. The method of claim 3 wherein the at least one motion sensor includes an accelerometer.

5. The method of claim 1 wherein measuring the transverse vibration response of the rod includes acquiring temporal data from at least one accelerometer secured to the rod and transforming the data to produce a measured frequency response of the rod.

6. The method of claim 5 wherein transforming the data includes Fourier Transformation.

7. The method of claim 1 wherein generating the theoretical transverse vibration response includes solving an equation of motion for the rod and computing a series of theoretical modal frequencies for the rod.

8. The method of claim 1 wherein generating the theoretical transverse vibration response includes compiling a finite element model of the rod and computing a series of theoretical modal frequencies.

9. The method of claim 1 wherein comparing the measured and theoretical transverse vibration responses includes superimposing a series of theoretical modal frequencies of the rod on a measured frequency response of the rod.

10. The method of claim 1 wherein adjusting the theoretical transverse vibration response includes changing one or more parameters in an equation of motion of the rod such that a theoretical modal frequency of the rod based on the equation of motion is approximately equal to a measured modal frequency of the rod.

11. The method of claim 1 wherein determining the tension in the rod includes varying a tension parameter in an equation of motion of the rod until a theoretical modal frequency of the rod based on the equation of motion is approximately equal a measured modal frequency of the rod.

12. The method of claim 1 including determining the size of impact device required to obtain a usable measured vibration response, the method including selecting an impact device of a certain weight, performing a test strike of the rod, and evaluating whether a test signal from at least one motion sensor mounted on the rod is saturated or too small.

13. The method of claim 12 wherein evaluating whether the test signal is saturated includes observing that portions of the test signal are clipped, and when portions of the test signal are clipped the method includes selecting an impact device of lesser weight and performing another test strike of the rod.

14. The method of claim 12 wherein evaluating whether the signal is too small includes observing that the signal is not discernable from noise, and when the test signal is not discernable from the noise the method includes selecting an impact device of a greater weight and performing another test strike of the rod.

15. The method of claim 2 wherein the rod is partially encased in a sheath and the sheath is embedded in a concrete structure.

16. The method of claim 15 wherein a second end portion of the rod is anchored within the concrete structure.

17. The method of claim 16 wherein the concrete structure forms a portion of a dam.

18. The method of claim 15 wherein the first end portion projects outwardly of the concrete structure and is connected to a trunnion for a movable gate spillway such that the rod is placed in tension by water retained by the gate.

19. A method of determining the tension in a rod that anchors a movable gate spillway trunnion to a dam, the method comprising:
 a. mounting one or more transverse motion sensors on the rod;
 b. impacting the rod and recording transverse motion data from the one or more sensors over a period of time;
 c. analyzing the transverse motion data and producing a measured frequency response of the rod;
 d. generating a theoretical model of the rod, calculating a theoretical frequency response of the model, and deriving a series of theoretical modal frequencies from the model, and;
 adjusting a tension parameter in the model such that at least one modal frequency of the model is approximately equal to a resonance frequency in the measured frequency response.

20. The method of claim 19 wherein mounting the one or more motion sensors on the rod includes mounting an accelerometer on the rod.

21. The method of claim 19 wherein impacting the rod includes selecting an impacting device of selected weight and striking the rod with the impacting device.

22. The method of claim 21 wherein selecting an impacting device includes performing a test impact by impacting the rod with an impacting device of a known weight and recording a test signal from the one or more sensors, wherein the method further includes evaluating whether the test signal exhibits saturation or is noise obscured, wherein when the test signal exhibits saturation selecting an impacting device of a lesser weight and performing another test impact, and wherein when the signal is noise obscured selecting an impacting device of a greater weight and performing another test impact.

23. The method of claim 19 wherein generating a theoretical model of the rod includes either developing a finite element model of the rod or deriving the equation of motion for the rod.

24. The method of claim 19 wherein adjusting the tension parameter includes superimposing the series of modal frequencies from the model on the measured frequency response of the rod and visualizing coincidence of one or more modal frequencies from the model with resonances in the measured frequency response.

* * * * *